Figure 1:
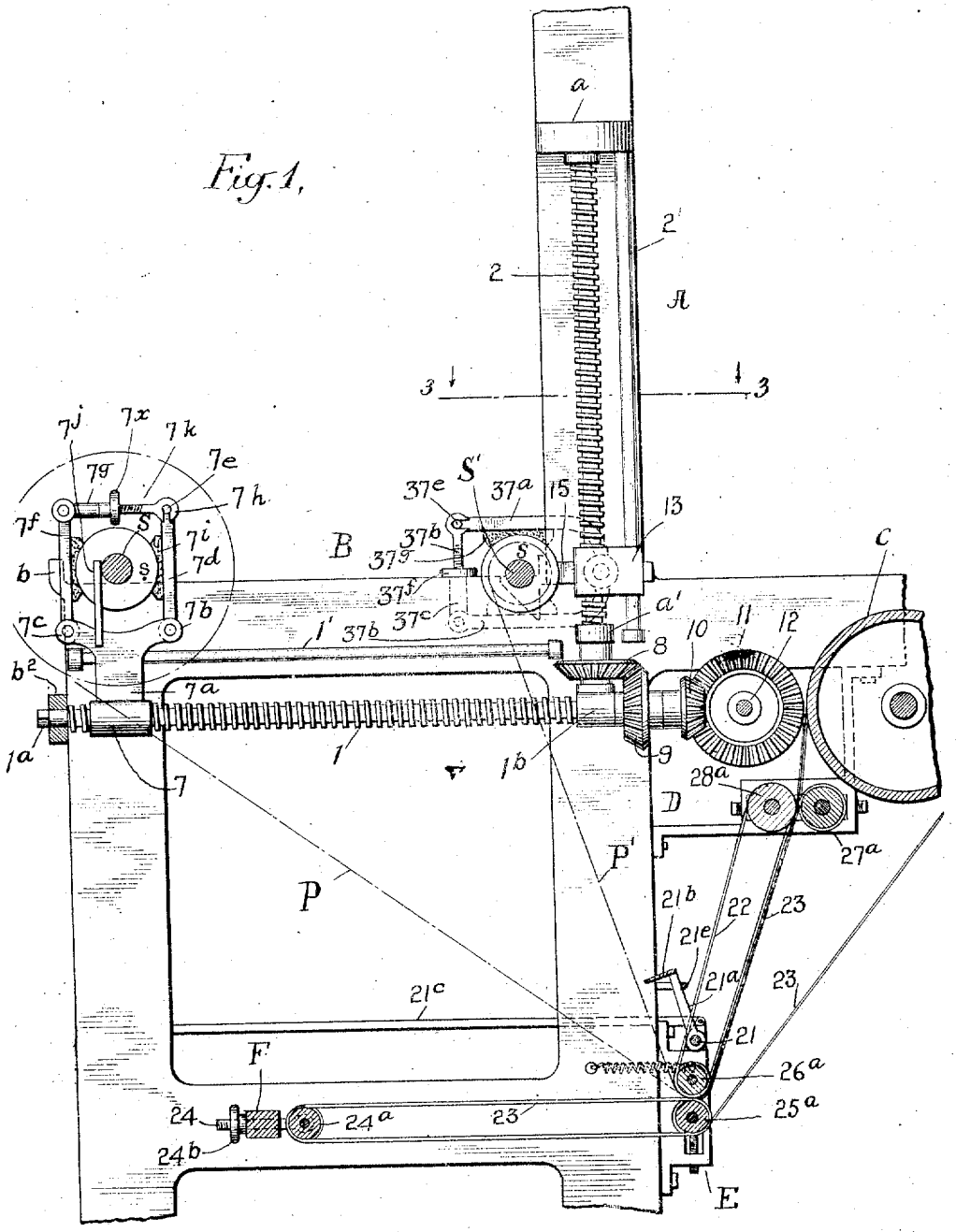

BEST AVAILABLE COPY

L. F. PFISTER.

MEANS FOR SUPPLYING AND FEEDING PAPER TO PRINTING PRESSES.

APPLICATION FILED DEC. 2, 1913.

Reissued Jan. 6, 1914.

13,672.

4 SHEETS—SHEET 1.

WITNESSES

Geo. Sadarius

George Schlatt

INVENTOR

Louis F. Pfister

BY

Kenyon & Kenyon

ATTORNEYS

L. F. PFISTER.

MEANS FOR SUPPLYING AND FEEDING PAPER TO PRINTING PRESSES.

APPLICATION FILED DEC. 2, 1913.

Reissued Jan. 6, 1914.

13,672.

4 SHEETS—SHEET 2.

WITNESSES

Geo. M. Harris

George Schlatt

INVENTOR

Louis F. Pfister

BY

Kenyon & Kenyon

ATTORNEYS

L. F. PFISTER.

MEANS FOR SUPPLYING AND FEEDING PAPER TO PRINTING PRESSES.

APPLICATION FILED DEC. 2, 1913.

Reissued Jan. 6, 1914.

13,672.

4 SHEETS—SHEET 3.

WITNESSES

George Schlatt

INVENTOR

Louis F. Pfister

BY Kenyon & Kenyon

ATTORNEYS

242. WINDING AND REELING,
Reeling
Fabrics
L. F. PFISTER.
MEANS FOR SUPPLYING AND FEEDING PAPER TO PRINTING PRESSES.
APPLICATION FILED DEC. 2, 1913.
Reissued Jan. 6, 1914. 13,672.
4 SHEETS—SHEET 4.
*Fig. 4,*
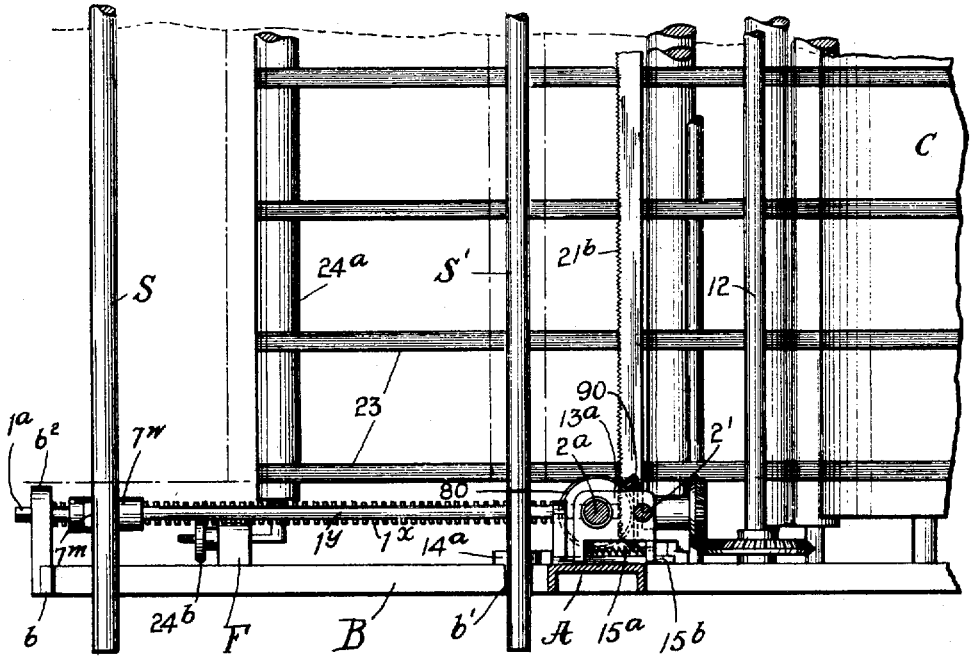
*Fig. 5,*
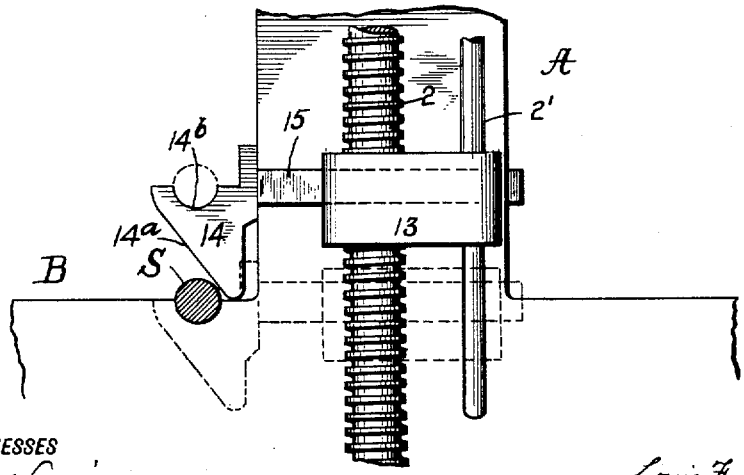
WITNESSES
George Harris
George Schlatt
INVENTOR
Louis F. Pfister
BY
Kenyon & Kenyon
ATTORNEYS
COLUMBIA PLANOGRAPH CO., WASHINGTON, D. C.

242.

Examiner

UNITED STATES PATENT OFFICE.

LOUIS F. PFISTER, OF DENVER, COLORADO, ASSIGNOR TO SAMUEL THOMAS WALKUP, OF NEW YORK, N. Y.

MEANS FOR SUPPLYING AND FEEDING PAPER TO PRINTING-PRESSES.

13,672. Specification of Reissued Letters Patent. Reissued Jan. 6, 1914.

Original No. 964,547, dated July 19, 1910, Serial No. 227,435. Application for reissue filed December 2, 1913. Serial No. 804,324.

*To all whom it may concern:*

Be it known that I, LOUIS F. PFISTER, a citizen of the United States, residing at Denver, county of Denver, and State of Colorado, formerly a resident of Boston, county of Suffolk, State of Massachusetts, have invented certain new and useful Improvements in Means for Supplying and Feeding Paper to Printing-Presses, of which the following is a specification.

The present invention relates to that class of printing presses wherein the paper to be printed is in the form of a web drawn from a roll and fed through the machine, the webs of successive rolls assuming such connected relation, that the paper from a plurality of rolls will be fed to the printing machine in a continuous web, without necessarily involving the stoppage of the press or the interruption of the printing operation.

The object of my invention comprises novel devices for adjusting a roll of paper in position, mechanism for removing the spindle or spindles of an exhausted roll, said mechanism being coactive with said devices so that the removal operation will be contemporaneous with the adjustment of a succeeding roll, peculiarly constructed and disposed feeding provision being employed for connecting the webs of the rolls, so that the paper will be efficiently fed to the press in a continuous manner.

There are other important features and combinations of parts connected with the invention, which features and combinations as well as those previously alluded to, are clearly set forth in the subsequent detailed description.

The accompanying drawings illustrate a portion of a printing press containing one embodiment of my invention, in which—

Figure 2:
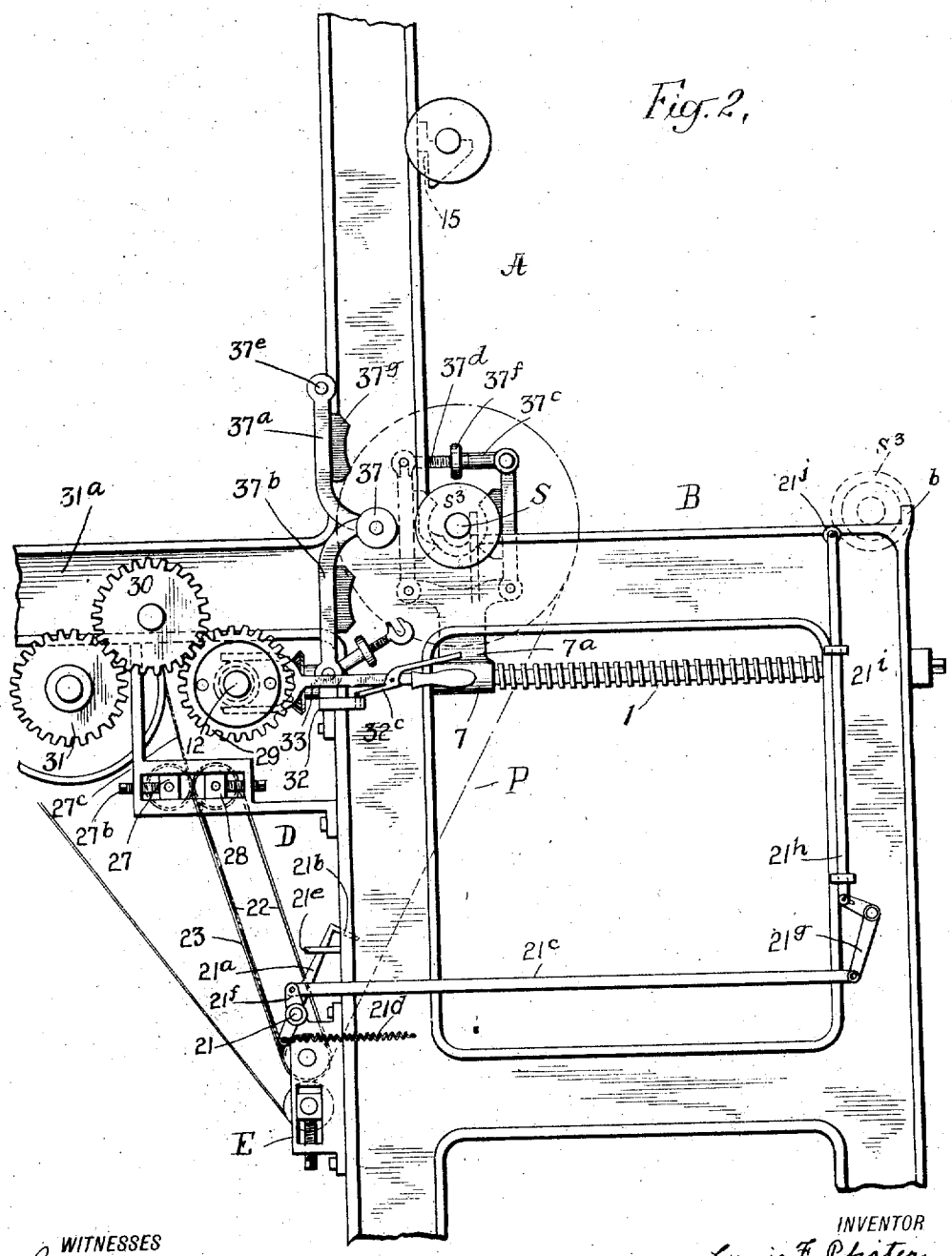
Figure 3:
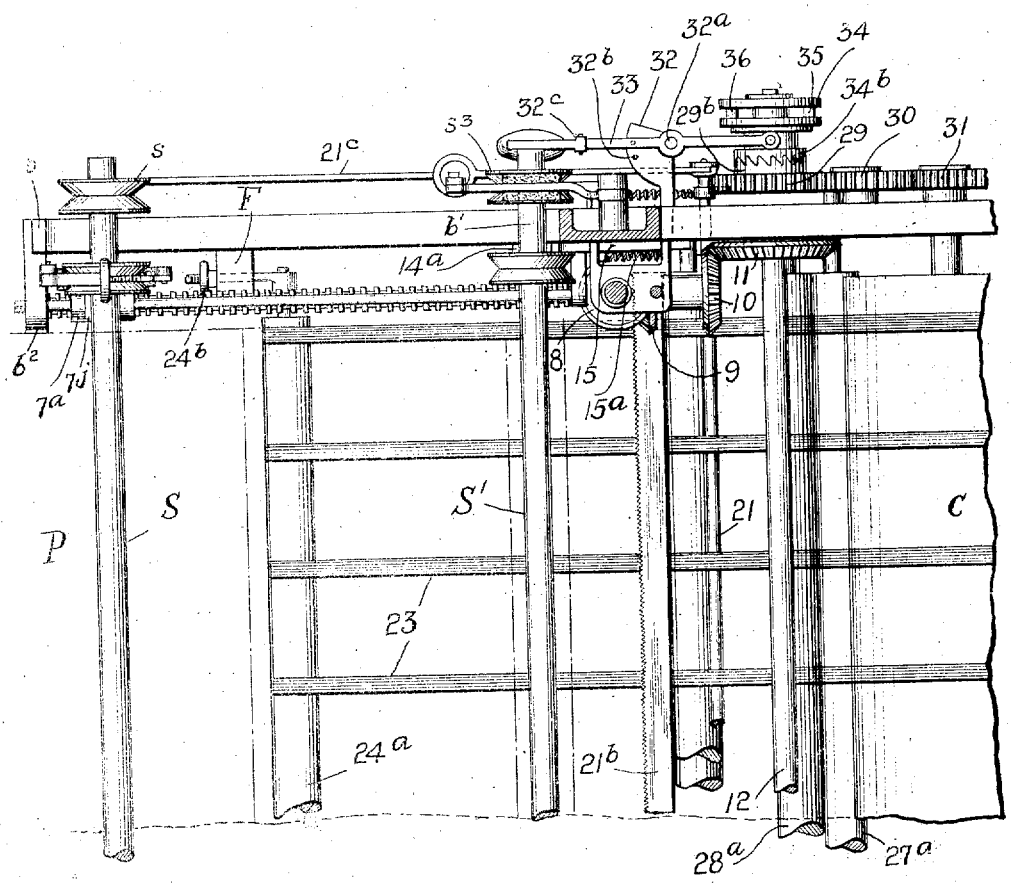

Figure 1 is a vertical section representing a roll of paper being represented in said figure as adjusted preliminary to superseding the spindle and core of an expiring roll. Fig. 2 is a side elevation of the portion of the frame viewed from a position opposite to that shown in Fig. 1, the renewal roll being in its full operative position, and the spindle and core of the exhausted roll being in an inoperative position. Fig. 3 is a detail sectional plan of the parts illustrated in Fig. 1, the section being in the plane indicated by the broken line 3—3, of said figure. Fig. 4 is a view similar to Fig. 3, but illustrating parts at the other side of the machine. Fig. 5 is a detail view, showing on an enlarged scale, one of the lifting brackets, its block and certain immediate features, the bracket and block being represented by full lines as near the limit of their downward movement, while dotted lines indicate said parts as having attained their lowest position.

Similar reference characters are employed to designate corresponding parts in the several figures of the drawings, where they occur.

In the embodiment of the invention disclosed herein, the rear standards A, of the frame of a printing press have the longitudinally disposed extensions B, B, the top parallel bars of which contain contiguous to the standard A, the upper open bearings $b'$, for the reception of the end portions of the spindle S′ carrying the roll of paper P′.

$b$, $b$, are upper projections located at the outer ends of the top bars of the extension B, which projections serve as stops for preventing the roll of paper P, from rolling off the top bars after having been placed in a position with the end portions of its spindle resting thereon.

Parallel horizontal screw shafts 1 and $1^x$ are located within the frame and its extension, said shafts having their outer ends journaled in bearings $b^2$ $b^2$, suitably carried by the frame, the projecting extremity $1^a$, of said shafts being keyed-ended for the application of a crank or other means to facilitate the rotation of the shafts by hand. The other end of the shaft is mounted in bearing $1^b$, $1^b$, secured on the inside of the frame.

A block or traveler 7 and $7^w$ are mounted on the shaft 1 and $1^x$, and have internal threads engaging with those of said shafts so that the blocks will travel back or forth as the shafts are revolved in one direction or the other. Integral with this traveler is a short standard $7^a$. At the upper part of the standard are front and rear horizontal ears $7^b$, $7^c$, respectively. A bar $7^d$, has one end pivotally connected to the ear $7^b$, while at its other end it is provided with a lateral lug $7^e$. Pivotally attached to the ear $7^c$, is one end of a bar $7^f$, to the other end of which is pivotally secured one end of a connecting link $7^g$, having its free end $7^h$ hook-shaped to engage the lug $7^e$, of the bar $7^d$, when both bars $7^d$, $7^f$ are swung to the vertical parallel position indicated most clearly in Fig. 1. Said bars carry on their inner vertical faces, friction shoes $7^i$, which may be of yielding material and which are preferably recessed to adapt them for intimately bearing within the grooved periphery of an adjacently located pulley *s*, keyed on the roll-spindle S. The frictional pressure exerted by said shoes can be varied by making the link $7^g$, of sections $7^j$, $7^k$, the former of which presents a threaded socket for the engagement of the threaded shank of the section $7^k$. Manifestly, by revolving a nut $7^x$, carried by the section $7^g$, the rod $7^k$, can be contracted or extended in length and result in an increase or diminution of the frictional pressure exerted on the pulley *s*.

A rod 1′, supported counter to the shaft 1, passes through the standard $7^a$, and operates to retain the block 7 and standard from turning on said shaft, and a similar rod $1^y$ passing through the block $7^w$ prevents it from turning on its shaft $1^x$.

In upper and lower bearings *a*, *a*′, on the inner side of the standards A, of the frame, is journaled a vertical screw shaft 2, on which is mounted a traveler or block 13, internal threads of which engage those of the shaft so that the traveler will move upward or downward according to the direction of rotation of the said shaft. A vertical guide rod 2′, suitably supported by the standard A, passes through and maintains the block 13 from turning on the shaft 2.

15 is a horizontal arm, supported by the block 13, so as to be movable longitudinally relative thereto, said arm being provided at its forward end with a bracket 14, having an upper depression or recess $14^b$, to serve as a bearing for one of the end portions of a roll-spindle. The other end of the roll spindle is carried by a corresponding arm 15. The outer edge $14^a$, of the bracket is inclined. The arm 15 is normally maintained in a projected position by means of a spring $15^a$, indicated in Fig. 3, said spring being interposed between abutments of the traveler and arm. Miter gears 8 and 9, secured on the shafts 1 and 2, respectively, serve to transmit motion to the latter from the revolution of the former.

One of the press-cylinders C, (see Figs. 2 and 3) has its shaft projecting at one side of the main frame, and to which is secured a gear 31, the revolution of which is caused by that of a gear 29 and an intermediate gear 30, said gear 29 forming part of the clutch mechanism on the transverse power shaft 12, the latter carrying a bevel gear 11, meshing with a gear 10 for simultaneously operating the screw-shafts 1 and 2.

$29^b$ is one member of a clutch secured to the gear 29, the latter being loosely mounted on the shaft 12.

$34^b$, is the movable member of the clutch, the jaw of which member is adapted to be engaged with that carried by the wheel 29. The movable member $34^b$, is adapted to be operated by a lever 33, the bifurcated or yoked end of which is suitably engaged with said member to slide the same upon the shaft 12. Small pins 35, 36 are rigidly carried by the movable part $34^b$ of the clutch and engage with openings in a disk 34, so that they may play back and forth within the same, said disk being secured to and movable with said shaft 12.

The arrangement of pins 35, 36, enables motion to be transmitted to overcome the load required in starting the paper-roll supply means into actuation, the points of transmission presented by the pins being more evenly distributed than were connection more directly with the shaft 12. Consequently there is less tendency of straining or wrenching the parts operated through the motion of the shaft 12.

Rigidly projecting from that side of the frame at which the lever 33, is located, is a horizontally disposed sector-shaped plate 32, (Figs. 2 and 3) provided with a stud $32^a$ on which said lever is pivoted, said plate containing a plurality of perforations $32^b$, arranged concentric with the pivot, and adapted to be engaged by the end of a dog $32^c$ pivotally carried by the lever at its underside. The lever and its dog are so connected that the handles of both can be conjointly grasped by the hand of the attendant, and the dog manipulated to maintain the same disengaged while the lever is swung to engage or disengage the clutch, in either of which positions the latter can be held by causing the end of the dog to enter the appropriate plate-perforation $32^b$.

Externally on the frame and approximately in a horizontal plane common to that and near the adjacent spindle-bearing *b*′, is a stud 37, on which is pivotally secured one end of each of a short bar $37^a$, and a bar $37^b$, both having parts curved so that when their straight portions are brought substantially parallel, there will be considerable intervening space between such portions. Pivotally secured to the free end of the bar $37^b$, is a connecting link comprising sections $37^c$, $37^d$, the former of which presents a socket for the sliding reception of the threaded shank of the section $37^d$, the free end of which is of hooked character to engage a pin $37^e$ laterally on the end of the bar $37^a$, and thereby retain said bar and link in the position illustrated most clearly in Fig. 1. A revoluble nut $37^f$ carried by the socket-section, can be manipulated to cause the threaded shank of the section $37^d$ to travel within or without the socket and thereby contract or extend the connecting rod. By this means the shoes $37^g$ carried by the rod and link can be adjusted to frictionally clamp a peripherally grooved pulley *s*, keyed on the end portion of the roll-spindle, projecting at one side of the frame. Obviously the degree of friction pressure, can be nicely regulated. The shoes can be of any suitable material, yielding or otherwise, and are preferably beveled and recessed to permit of their intimate conformation with the pulley-periphery.

It will be understood that the shaft 12, extends and is suitably supported at the opposite side of the frame from that before described and at such side communicates through bevel gearing 90, 80, motion to a vertical threaded shaft $2^a$, at that side, and on which latter is a traveling block with a spring bracket arm $15^b$, carrying a spring $15^a$ constructed and coincidently operating in all respects similar to the arrangements of shaft 2, and its block and arm previously described. Short vertical rods $7^j$ and $7^m$, are carried by the standard $7^a$ and block $7^w$, respectively, and are adapted to bear against the spindle S, at each end of the paper-roll, so that said spindle and roll will be maintained in true transverse position during its travel and the uniform pay of the web insured.

Angular brackets D, D, are secured to the main frame at both sides thereof so as to provide in a lower plane in proximity to one side of the cylinder C, a pair of adjustable bearing boxes 27, 28, in which are supported the journals of transverse rollers $27^a$, $28^a$. Bolted to the lower portion of the main frame at each side thereof and a considerable distance below the brackets D, D, are brackets E, E, comprising bearings for lower transverse companion rollers $25^a$, $26^a$. In the lower part of the frame-extension is a transverse bar F, in which near the ends, slidingly bear longitudinally disposed eye-bolts 24, the eyes of which constitute bearings for the short journals of a lower roller $24^a$, the threaded shanks of the bolts being engaged by hand nuts $24^b$, whereby the position of the roller $24^a$, can be longitudinally varied.

Led around the cylinder C, and roller $24^a$, and in contact with the roller $27^a$, are a series of relatively spaced endless tapes 23, of suitable fabric, one of the passes of each tape extending around the underside of and in contact with the lower roller $25^a$. Also led around the rollers $28^a$ and $26^a$, are shorter endless tapes 22 which coincide in position with portions of the tapes 23 in so far as their lengths permit. It will be appreciated that the tension of the tapes 23 can be so regulated by the eye-bolts 24 and their nuts which in fact constitute a tape-tightener, that the positive rotation of the cylinder C, will affect the travel of said tapes. The adjustments of the rollers $24^a$ and $26^a$ should be such that the tapes 23 and 22, should be taut so that the tapes will occupy the relative position illustrated in Fig. 1, the upper passes of the tapes 23, frictionally driving the rollers of the tapes 22, by reason of the driving pressure exerted by said upper passes through the intervening thicknesses of the tapes 22.

The machine is so geared that ascending inclined passes of the tapes 23 and 22, will move in close contact with a moderate amount of yield, there being a corresponding yielding pinch between the upper and lower pairs of companion rollers $27^a$, $28^a$, and $25^a$ and $26^a$.

In the tops of the brackets E are journaled a transverse rock shaft 21 having rigidly connected thereto, arms $21^a$, close to the inner sides of the frame. These arms carry at their upper ends an angularly disposed blade $21^b$, the free edge of which is serrated as shown in Figs. 3 and 4, to facilitate its penetrating and severing the contiguous web of paper.

One of the ends of the shaft 21 projects externally for a short distance at one side of the frame and has secured thereto a bell crank lever $21^f$, to one arm of which and to the frame is secured a contractile spring $21^d$, which normally tends to throw the arms $21^a$ and blade $21^b$ in a direction opposite to that indicated by the arrow, Fig. 1, such movement being limited by a loop $21^e$ on an adjacent part of the frame. Pivotally connected to the arm of lever $21^f$, opposite to that to which the spring $21^d$ is attached, is one end of an extended rod $21^c$, the other end of which is pivotally secured to a bell-crank lever $21^g$, externally at one side of the extension B, said bell-crank lever in turn being connected to the lower end of a vertical rod $21^h$, playing in guides $21^i$, on the extension, said rod carrying at its upper end adjacent to the nearest top bar, a contact roller $21^j$, in the path of travel of the outer pulley *s′*, of the roll-spindle.

If the parts be in the positions illustrated in Fig. 1, it will be noted that the end portions of the spindle S′ of an expiring roll of paper, occupy the bearings *b′*, *b′*, the bars $37^a$ and $37^b$, being retained by the hook link, so that the shoes of said bars frictionally clamp the pulley $s^3$, on said spindle. Under such conditions, the spindle S′, and the core and remainder of the paper thereon are not only retained in position, but the pay of the web is frictionally retarded to the desired extent in order to avoid a too free paper supply. This web is indicated by a dotted line P′, which illustrates the same as descending and passing between the yielding tape surfaces of the rollers $25^a$, $26^a$, and then carried up in close contact between the ascending passes of the tapes 22, 23, the web next passing through the yielding pinch of the rollers $27^a$, $28^a$, after which it continues around the cylinder C, and is fed to the printing mechanism of the press. This feed continues until the paper carried by the spindle S′, is about expiring. At this time, a new roll is placed upon the end of the extension B, with its spindle S resting on the top bars of said extension and its end portions projecting beyond the same. The bars $7^b$, and $7^t$, are then arranged so that the link $7^s$ connects them, with the result that the shoes $7^i$, engage the pulley *s*, and are caused to frictionally clamp the said pulley with the desired degree of pressure, by the manipulation of the nut $7^x$. This renders the bodily longitudinal movement of the new roll of paper dependent upon the actuation of the blocks 7 and $7^w$. The end of the web of paper P, with paste applied to the upper surface thereof a short distance from the end is then brought down by hand and carried to and introduced by hand between the pinch of the tapes at the rolls $25^a$, $26^a$, and drawn in between the rolls until it is taut, the new web roll being held stationary, and so that the pasted portion of the new web does not come in contact with the old web. The parts remain in this condition until it is desired to splice the two webs together, when the new roll is released so that the pinch of the tapes between the rolls $25^a$ and $26^a$ then causes the new web to be drawn in and moved with the paper P′ so that pasted connection is established with the latter.

The retarding device embodying the bars $37^a$ and $37^b$, having meanwhile been disengaged, as indicated in Fig. 2, to release the spindle of the expiring roll, the lever 33, is operated and locked to engage and hold engaged the clutch mechanism. The proper revolution of the screw-shafts 1, $1^x$ and 2, $2^a$, is thus occasioned with the result that the traveling blocks 13, $13^a$, ascend and through the medium of their arms 15, $15^b$, lift the spindle S′, and its core and remainder of paper thereon, to an elevated plane.

The blocks 7, $7^w$, coincidently travel forwardly along their screw shafts and the spindle S rolls with a frictional retardation, forwardly along the top bars of the extension B. As the spindle travels forward, the grooved pulley on one of the projecting portions of the spindle will contact with the roller $21^j$, and depress the rod $21^h$, so that the latter will through its connections, turn the shaft 21, to throw the blade $21^b$, in the direction of the arrow Fig. 1, and effect the severing of the web of paper P′, from the expiring roll. Thereafter, as the paper-feed is being conducted from the new roll, the latter and its spindle continues its movement until the end portions of said spindle enter and turn within the bearings *b*′. The clutch mechanism is disengaged at this stage. The bars $37^a$, $37^b$, together with their connecting link are then adjusted to cause their shoes to clamp the outer pulley on the spindle, and the inner arms $7^b$ and $7^t$ are thrown off to release the pulley *s*, from engagement with the shoes $7^d$. The further draft on the paper is effected by the pull exerted by the feeding means of the press proper. During this period, a hand crank key is applied to the end of the shaft 1, to revolve it and the screw shaft $1^x$, in a direction the reverse of that which said shafts previously had been revolved, with the result that the block 7, and parts carried thereby as well as the block $7^w$, and its vertical rod $7^m$, are retracted to a position ready for reaction with a further roll of paper.

Subsequent to the severing of the paper P′, and preferably before the reverse movement of the horizontal screw-shafts, the spindle and core together with the paper remnant of the exhausted roll, are removed from the bracket arms 15. Therefore, when the blocks 7 and $7^w$, are retracted as stated, the vertical shafts 2 will also be reversely revolved to lower the blocks 13, so that their bracket arms will take under the spindle now in operative position, the inclined faces of the arm-ends near the limit of their downward movement, contacting with the end portions of the spindle so that said arms will yield to clear and thereafter pass under the spindle.

It will be seen from the foregoing description that the pasted end of the new roll of paper is drawn between the yielding pinch of the tapes at the rollers $25^a$, $26^a$, and pressed into pasted connection with the web from the expiring roll, the two webs being carried up between the ascending passes of the tapes 23, 22, which have the effect of maintaining and guiding the joined webs in a smooth condition for feed to the printing mechanism proper of the press, the operations being so conducted that the web of the expiring roll of paper will be severed at such period that but a comparatively limited length of the paper P′, will conjointly pass with the paper P, to the said printing mechanism. The pinch of the tapes at the companion rollers $27^a$, $28^a$, besides providing for the frictional driving of the tapes, also contributes to the frictional feeding of the paper and serves to effectuate the pasted connection of the two webs.

By employing the frictional retarding devices for the roll of paper which is in the operative position with respect to the press, as well as for the roll that is to supersede said first mentioned roll, the paying out of the web from either roll is so regulated and controlled that the web passing to the machine is maintained under a proper amount of tension, and hence undue looseness and consequent buckling are avoided.

I attach particular importance to the fact that the clamp device carried by the block 7, by engaging within the grooved periphery of the spindle pulley *s*, prevents any lateral shifting movement of the spindle and its paper roll. By this means, the even feed of the web is promoted, and the accurate guiding of the spindle to the bearings *b'*, *b'*, insured.

The construction and arrangement of the features embodying my improvements, are such that they are compactly disposed. Moreover, they admit of the several operations of adjusting the pasted end of the paper from a new roll, the engagement and disengagement of the retarding devices and the manipulation of the clutch lever being conveniently conducted by the attendants.

Having now described my invention, what I claim as new and desire to secure by Letters Patent, is—

1. In combination with a printing press, means for supporting a spindle of a roll of paper and guiding it to its operative position for use for the press, a traveler constructed to be connected with the spindle and to retard its rotation, and means for feeding said traveler toward said operative position.

2. In combination with a printing press, means for supporting a spindle of a roll of paper and guiding it to its operative position for use for the press, a traveler, means for connecting said traveler to and disconnecting it from the spindle, and when connected to retard the rotation of said spindle, and means for feeding said traveler toward said operative position.

3. In combination with a printing press, means for supporting a spindle of a roll of paper and guiding it to its operative position for use for the press, a traveler constructed to be connected with the spindle and to frictionally retard its rotation, and means for feeding said traveler toward said operative position.

4. In combination with a printing press, means for supporting a spindle of a roll of paper and guiding it to its operative position for use for the press, a traveler, means for connecting said traveler to and disconnecting it from the spindle and when connected to frictionally retard the rotation of said spindle, and means for feeding said traveler toward said operative position.

5. In combination with a printing press, a traveler, means for connecting said traveler to the spindle of a roll of paper and to frictionally retard its rotation, and means for raising said traveler away from operative position of said roll.

6. In combination with a printing press, means for supporting a spindle of a roll of paper and guiding it to its operative position for use for the press, a traveler constructed to be connected with the spindle and to retard its rotation, and means for feeding said traveler toward said operative position, a second traveler having means for supporting the spindle of a roll of paper, and means for withdrawing a roll spindle from operative position.

7. In combination with a printing press, means for supporting a spindle of a roll of paper and guiding it to its operative position for use for the press, a traveler constructed to be connected with the spindle and to retard its rotation, and means for feeding said traveler toward said operative position, a second traveler, having means for supporting the spindle of a roll of paper, and means for withdrawing a roll spindle from operative position during the feeding of the other traveler to operative position.

8. In combination with a printing press, means for supporting a spindle of a roll of paper and guiding it to its operative position for use for the press, a traveler, means for connecting said traveler to and disconnecting it from the spindle, and when connected to retard the rotation of said spindle, and means for feeding said traveler toward said operative position, a second traveler having means for connecting it to the spindle of a roll of paper and for frictionally retarding its rotation, and means for withdrawing said spindle from operative position.

9. In combination with a printing press, means for supporting a spindle of a roll of paper and guiding it to its operative position for use for the press, a traveler, means for connecting said traveler to and disconnecting it from the spindle, and when connected to retard the rotation of said spindle, and means for feeding said traveler toward said operative position, a second traveler having means for connecting it to the spindle of a roll of paper and for frictionally retarding its rotation, and means for withdrawing said spindle from operative position during the feeding of the other traveler to operative position.

10. In combination with a printing press, means for feeding a web to the press, and a movable band below, leading to said feeding means, and extending in the same direction and adjacent to said means.

11. In combination with a printing press, means for feeding a web to the press, and a movable band extending in a substantially horizontal direction to said feeding means, and then extending in the same direction as said means, and adjacent therewith.

12. In combination with a printing press, a movable band for feeding a web to the press, and a second movable band below, leading to said feeding band and extending in the same direction and adjacent therewith.

13. In combination with a printing press, means for feeding a web to the press, means for supporting a spindle of a second web and guiding it to its operative position, and a severing device for the first web constructed and arranged to be operated to sever said web by the movement of the spindle of the second web to its operative position.

14. In combination with a printing press, means for feeding a web to the press, means for supporting a spindle of a second web and guiding it to its operative position, a severing device for the first web, and means connected with said device and extending to said spindle guiding support, whereby the movement of the spindle along said support will actuate the connected means to operate the severing device to sever the first web.

15. In means of the character described, the combination with screw shafts and coacting devices for moving a roll of paper into an operative position with respect to a printing press and for removing the spindle of an expiring roll from such position, of endless band provision for feeding the web from the first mentioned roll along with that of the expiring roll.

16. In means of the character described, the combination with screw shafts and coacting devices for moving a roll of paper into an operative position with respect to a printing press and for removing the spindle of an expiring roll from such position, of endless band provision for feeding the web from the first mentioned roll along with that of the expiring roll, clutch mechanism for controlling the actuation of said screw shafts and devices, and means for driving the band provision from the motion of the press.

17. In means of the character described, the combination with a screw shaft and block traveling thereon, of a clamping device for a roll of paper, said device being carried by said block.

18. In means of the character described, the combination with a screw shaft and block traveling thereon, of a clamping device for a roll of paper, said device carried by said block and embodying means for retarding the pay of the paper from said roll.

19. In means of the character described, the combination with suitable bearings for the spindle of a roll of paper, of a screw shaft and coacting devices including yielding bracket arms for engaging said spindle and removing it from said bearings, and endless bend provision for feeding the web from the roll.

20. In means of the character described, the combination with suitable bearings for the spindle of a roll of paper, of a screw shaft and coacting devices including yielding bracket arms for engaging said spindle and removing it from said bearings, and a device for severing the web from the roll.

21. In means of the character described, the combination with a screw shaft and coacting devices for removing the spindle of an expiring roll of paper from an operative position with respect to a printing press, of endless band provision for feeding the web from said roll.

22. In means of the character described, the combination with a screw shaft and coacting devices for removing the spindle of an expiring roll of paper from an operative position with respect to a printing press, of endless band provision for feeding the web from said roll, clutch mechanism for controlling the actuation of said shaft and coacting devices, and means for driving said band provision from the motion of the press.

23. In a change web roll device, the combination of a web roll spindle and means controlled by said spindle for severing a web from another web roll spindle.

24. A change web roll device having means governed by a fresh web roll for severing a web from its spindle.

In testimony whereof I have signed my name to this specification in the presence of two subscribing witnesses.

LOUIS F. PFISTER.

Witnesses:
EDWIN C. STOUGHTON,
W. C. HEINZ.

Copies of this patent may be obtained for five cents each, by addressing the "Commissioner of Patents, Washington, D. C."